(12) United States Patent
Wang et al.

(10) Patent No.: US 8,061,703 B2
(45) Date of Patent: Nov. 22, 2011

(54) SHEET-FEEDING TYPE SCANNING APPARATUS AND AUTOMATIC SHEET FEEDING METHOD

(75) Inventors: Chung-Kai Wang, Taipei (TW); Chao-Min Yang, Taipei (TW); Wei-Hsun Hsu, Taipei (TW); Wen-An Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 65 days.

(21) Appl. No.: 12/618,972

(22) Filed: Nov. 16, 2009

(65) Prior Publication Data

US 2011/0042883 A1 Feb. 24, 2011

(30) Foreign Application Priority Data

Aug. 21, 2009 (TW) .............................. 98128172 A

(51) Int. Cl.
*B65H 5/00* (2006.01)
*B65H 5/26* (2006.01)
(52) U.S. Cl. .................. 271/10.03; 271/10.13; 271/110; 271/9.09; 271/9.01
(58) Field of Classification Search .............. 271/10.03, 271/10.13, 110, 9.09, 9.01
See application file for complete search history.

(56) References Cited

U.S. PATENT DOCUMENTS

| | | | | |
|---|---|---|---|---|
| 5,192,067 A * | 3/1993 | Saito | .......................... | 271/10.03 |
| 5,209,465 A * | 5/1993 | Sayama et al. | ................ | 271/110 |
| 5,534,973 A * | 7/1996 | Harada | .............................. | 399/1 |
| 5,547,181 A * | 8/1996 | Underwood | ................... | 271/114 |
| 5,738,453 A * | 4/1998 | Tsuburaya et al. | ........... | 400/624 |
| 5,755,435 A * | 5/1998 | Fujiwara | ...................... | 271/4.04 |
| 6,485,011 B1 * | 11/2002 | Yen et al. | ..................... | 271/10.03 |
| 6,612,561 B2 * | 9/2003 | Sekine | .......................... | 271/3.14 |
| 6,738,167 B1 * | 5/2004 | Suzuki | .......................... | 358/498 |
| 6,942,215 B2 * | 9/2005 | Kang et al. | ............... | 271/265.01 |
| 6,962,332 B2 * | 11/2005 | Su | .................................. | 271/4.01 |
| 7,136,202 B2 * | 11/2006 | Jang et al. | ...................... | 358/474 |
| 7,780,161 B2 * | 8/2010 | Silverbrook et al. | ...... | 271/10.01 |
| 7,806,397 B2 * | 10/2010 | Wang et al. | .................. | 271/9.09 |

* cited by examiner

*Primary Examiner* — Stefanos Karmis
*Assistant Examiner* — Luis A Gonzalez
(74) *Attorney, Agent, or Firm* — Kirton & McConkie; Evan R. Witt

(57) ABSTRACT

A sheet-feeding type scanning apparatus and an automatic sheet feeding method are provided. The sheet-feeding type scanning apparatus includes a scanning module, a first sheet input tray, a first sheet pick-up roller assembly, a sheet ejecting tray, a sheet transfer channel, a plurality of transfer roller assemblies, a sheet ejecting roller assembly, a sheet-feeding sensor and a clutch module. Once a first sheet article of multiple sheet articles placed on the first sheet input tray are fed into the internal portion of the sheet-feeding type scanning apparatus to trigger the sheet-feeding sensor, the clutch module is disabled. At this moment, a second sheet article placed on the first sheet input tray fails to be fed by the first sheet pick-up roller assembly. Therefore, the double feeding problem is solved.

19 Claims, 6 Drawing Sheets

SHEET-FEEDING TYPE SCANNING APPARATUS AND AUTOMATIC SHEET FEEDING METHOD

FIELD OF THE INVENTION

The present invention relates to a scanning apparatus, and more particularly to a sheet-feeding type scanning apparatus having a mechanism for automatically feeding sheet articles.

BACKGROUND OF THE INVENTION

Scanning apparatuses are widely used for scanning images of documents. The scanned images can be converted into electronic files, which are then stored, processed or spread. With increasing development of scanning technologies, the scanning apparatuses have experienced great growth and are now rapidly gaining in popularity.

In the early stage, the scanning apparatus can scan one side of the document. For scanning both sides of the document, after one side of the document has been scanned, the document should be manually turned over so as to scan the other side of the document. As known, the process of manually turning over the document is troublesome. Recently, an automatic document feeder is usually integrated into the scanning apparatus. After a stack of documents to be scanned are placed on the sheet input tray of the automatic document feeder, the sheet-feeding mechanism of the automatic document feeder will successively transport the sheet to perform the scanning operation without the need of manually turning over the documents. This means of automatically feeding the sheet sheets is both time-saving and efficient. It is found that the scanning apparatuses are improved according to the generation development and the diverse demands.

Generally, the pick-up roller and the separation roller of the sheet-feeding type scanning apparatus are abraded after a long-term use period. As such, a so-called double feeding problem occurs when a stack of documents are fed into the internal portion of the sheet-feeding type scanning apparatus. Once the double feeding problem occurs, two or more documents are simultaneously fed into the internal portion of the sheet-feeding type scanning apparatus. Since second document is partially or completely superimposed with the first document when the double feeding problem occurs, the second document is incompletely scanned or fails to be scanner. In other words, the double feeding problem is detrimental to the performance of the sheet-feeding type scanning apparatus.

Therefore, there is a need of providing a sheet-feeding type scanning apparatus for solving the double feeding problem.

SUMMARY OF THE INVENTION

It is an object of the present invention to provide a sheet-feeding type scanning apparatus for solving the double feeding problem.

Another object of the present invention provides a method for automatically feeding documents so as to solve the double feeding problem.

In accordance with an aspect of the present invention, there is provided a sheet-feeding type scanning apparatus for scanning a sheet article. The sheet-feeding type scanning apparatus includes a scanning module, a first sheet input tray, a first sheet pick-up roller assembly, a sheet ejecting tray, a sheet transfer channel, a plurality of transfer roller assemblies, a sheet ejecting roller assembly, a sheet-feeding sensor and a clutch module. The scanning module is used for scanning the sheet article when the sheet article is transported across a scan region, thereby obtaining an image of the sheet article. The first sheet input tray is arranged at a first side of the scanning module for placing the sheet article thereon. The first sheet pick-up roller assembly is arranged beside the first sheet input tray for feeding the sheet article that is placed on the first sheet input tray into an internal portion of the sheet-feeding type scanning apparatus. The sheet ejecting tray is used for supporting the sheet article after being scanned. The sheet transfer channel is arranged between the first sheet input tray and the scan region for leading the sheet article. The transfer roller assemblies are used for transporting the sheet article. The sheet ejecting roller assembly is arranged beside the sheet ejecting tray for transporting the sheet article to the sheet ejecting tray. The sheet-feeding sensor is arranged at a second side of the scanning module for detecting the sheet article. Once the sheet article is detected by the sheet-feeding sensor, the sheet-feeding sensor is triggered to generate a disabling signal. The clutch module is connected to the sheet-feeding sensor for controlling whether power is transmitted to the first sheet pick-up roller assembly. In response to the disabling signal, the clutch module is disabled such that an operation the first sheet pick-up roller assembly is terminated.

In an embodiment, the sheet-feeding type scanning apparatus further includes a second sheet input tray and a second sheet pick-up roller assembly. The second sheet input tray is arranged at the second side of the scanning module for placing a second sheet article thereon. The second sheet pick-up roller assembly is arranged beside the second sheet input tray for feeding the second sheet article that is placed on the second sheet input tray into the internal portion of the sheet-feeding type scanning apparatus. The second sheet article is a business card.

In an embodiment, the sheet-feeding type scanning apparatus further includes a power-switching module for controlling the power to be transmitted to the first sheet pick-up roller assembly or the second sheet pick-up roller assembly.

In an embodiment, the power-switching module includes a solenoid valve, a switching element, a fastening arm and a power-switching gear set. The switching element is arranged beside the solenoid valve, and includes a first notch and a second notch. The fastening arm is connected to the solenoid valve and swung according to an action of the solenoid valve, so that the fastening arm is fixed in the first notch or the second notch. The power-switching gear set includes a first power-switching gear and a second power-switching gear. The first power-switching gear is engaged with the second power-switching gear to transmit the power to the second power-switching gear. The second power-switching gear is disposed on the switching element. The second power-switching gear transmits the power to the first sheet pick-up roller assembly or the second sheet pick-up roller assembly according to a rotating status of switching element.

In an embodiment, the sheet-feeding type scanning apparatus further includes a power transmission module. The power transmission module is connected to the first sheet pick-up roller assembly and the second sheet pick-up roller assembly for transmitting the power to the first sheet pick-up roller assembly or the second sheet pick-up roller assembly.

In an embodiment, the power transmission module includes a first transmission gear set, a second transmission gear and a transmission belt.

In an embodiment, when the switching element is rotated to have the fastening arm fixed in the first notch, the second power-switching gear is engaged with the first transmission gear set, so that the power-switching module transmits power transmits the power to the first sheet pick-up roller assembly.

Whereas, when the switching element is rotated to have the fastening arm fixed in the second notch, the second power-switching gear is engaged with the second transmission gear set, so that the power-switching module transmits power transmits the power to the second sheet pick-up roller assembly.

In an embodiment, the first sheet pick-up roller assembly further includes a first sheet pick-up roller shaft. The first sheet pick-up roller shaft is sheathed by the first sheet pick-up roller assembly and connected to the first transmission gear set of the power transmission module for receiving the power from the power transmission module, thereby driving the first sheet pick-up roller assembly.

In an embodiment, the second sheet pick-up roller assembly further includes a second sheet pick-up roller shaft. The second sheet pick-up roller shaft is sheathed by the second sheet pick-up roller assembly and connected to the second transmission gear set of the power transmission module for receiving the power from the power transmission module, thereby driving the second sheet pick-up roller assembly.

In an embodiment, the clutch module includes a magnetic coil element, a connecting part and a metallic plate. The magnetic coil element is used for generating a magnetic force. The connecting part is coupled to the magnetic coil element, and includes a saw-toothed recess. The connecting part is rotated with respect to the magnetic coil element or synchronously rotated with the magnetic coil element. The metallic plate is accommodated within the saw-toothed recess of the connecting part, and includes a plurality of saw-toothed structures. When the magnetic coil element is magnetized to generate the magnetic force, the metallic plate is attracted by the magnetic coil element and the saw-toothed structures of the metallic plate are engaged with the saw-toothed recess, so that the metallic plate is synchronously rotated with the magnetic coil element. Whereas, when the magnetic coil element is not magnetized, the metallic plate is accommodated within the saw-toothed recess, so that the connecting part is rotated with respect to the magnetic coil element.

In an embodiment, the sheet-feeding type scanning apparatus further includes a motor for providing power, and a motor gear set for transmitting the power that is provided by the motor.

In an embodiment, the sheet-feeding type scanning apparatus further includes a transfer shaft. The transfer shaft is connected to the motor gear set and the clutch module and rotated when the power provided by the motor is received.

In an embodiment, the motor is a stepper motor.

In an embodiment, the sheet article is an A4-sized document.

In accordance with another aspect of the present invention, there is provided an automatic sheet feeding method for controlling a sheet-feeding type scanning apparatus to feed a single sheet article in each time. The sheet-feeding type scanning apparatus includes a clutch module, a plurality of transfer roller assemblies, a sheet-feeding sensor and a scanning module. The scanning module is arranged beside a scan region. The automatic sheet feeding method includes the following steps. In a step (a), the clutch module is enabled. In a step (b), a first sheet article of multiple sheet articles is fed into an internal portion of the sheet-feeding type scanning apparatus by the transfer roller assemblies. Then, the automatic sheet feeding method includes a step (c) of discriminating whether the sheet-feeding sensor is triggered by the first sheet article. Once the sheet-feeding sensor is triggered by the first sheet article, the clutch module is disabled, so that a second sheet article of the multiple sheet articles is not permitted to be fed into internal portion of the sheet-feeding type scanning apparatus, and the first sheet article is transported into the scan region by the transfer roller assemblies to be scanned by the scanning module. Whereas, if the sheet-feeding sensor is not triggered by the first sheet article, the automatic sheet feeding method includes a step (d) of discriminating whether the shift amount of the first sheet article is greater than a threshold value. Once the shift amount of the first sheet article is not greater than the threshold value, the step (b) is repeatedly done. Whereas, once the shift amount of the first sheet article is greater than the threshold value, an operation of the sheet-feeding type scanning apparatus is terminated.

In an embodiment, the automatic sheet feeding method further includes a step of discriminating whether the first sheet article is departed from the scan region after the first sheet article is scanned by the scanning module. Once the first sheet article is departed from the scan region, the step (a) is repeatedly done to feed the second sheet article into the internal portion of the sheet-feeding type scanning apparatus by the transfer roller assemblies. Whereas, once the first sheet article is not departed from the scan region, the first sheet article is continuously transported by the transfer roller assemblies.

In an embodiment, the sheet articles are ordinary documents.

In an embodiment, the sheet articles are business cards.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
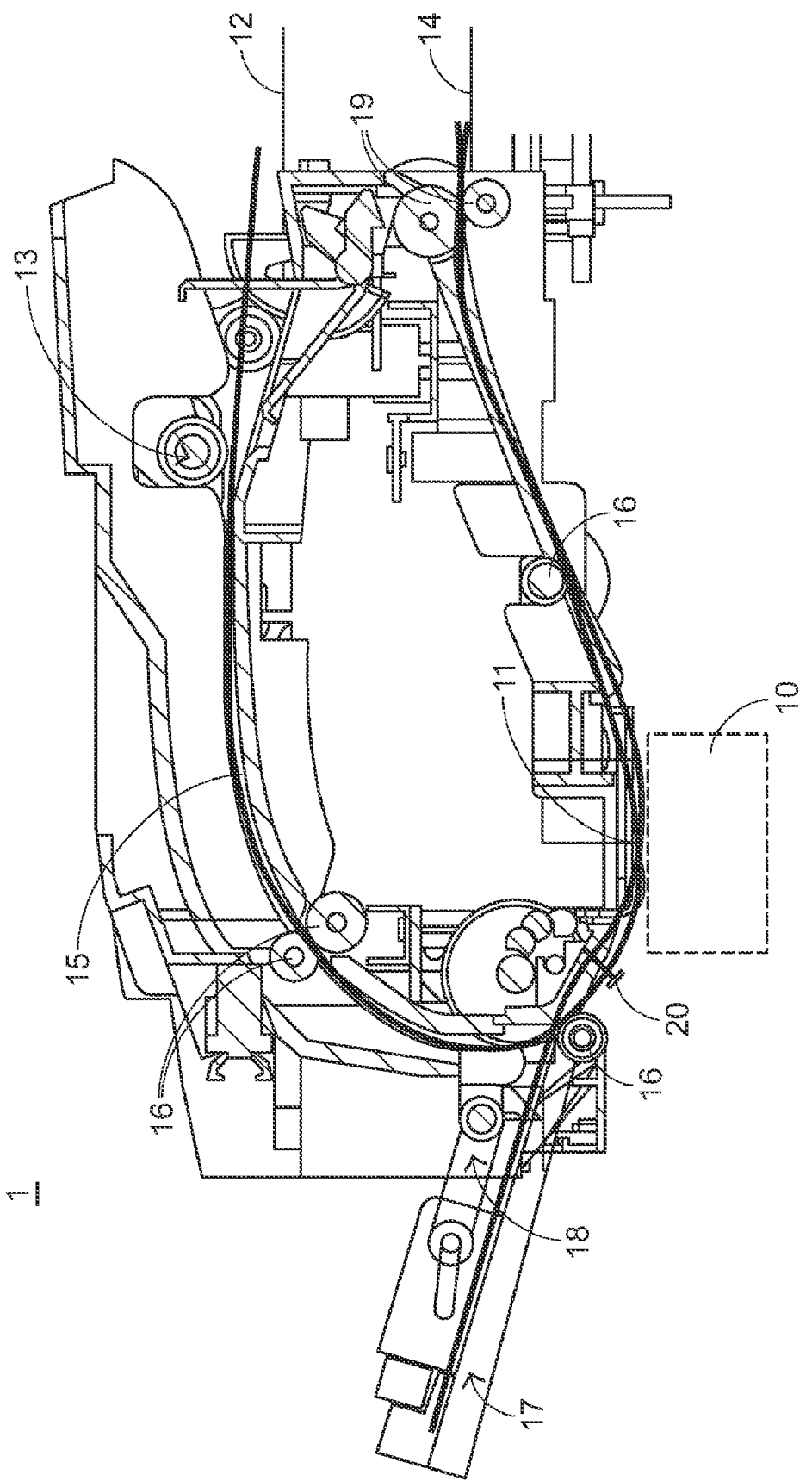
FIG. 1 is a schematic cross-sectional view illustrating a sheet-feeding type scanning apparatus according to an embodiment of the present invention.

For obviating the drawbacks encountered from the prior art, the present invention provides a sheet-feeding type scanning apparatus for effectively preventing from the double feeding problem. Hereinafter, a sheet-feeding type scanning apparatus having two sheet input trays is illustrated in more details. FIG. 1 is a schematic cross-sectional view illustrating a sheet-feeding type scanning apparatus according to an embodiment of the present invention. As shown in FIG. 1, the sheet-feeding type scanning apparatus 1 comprises a scanning module 10, a first sheet input tray 12, a first sheet pick-up roller assembly 13, a sheet ejecting tray 14, a sheet transfer channel 15, a plurality of transfer roller assemblies 16, a sheet ejecting roller assembly 19, a second sheet input tray 17, a second sheet pick-up roller assembly 18, a sheet-feeding sensor 20, a power transmission module 21 (see FIG. 2), a power-switching module 22 (see FIG. 2), and a clutch module 23 (see FIG. 2). The first sheet input tray 12 is used for placing thereon multiple first-type sheet articles (not shown) to be scanned. The second sheet input tray 17 is used for placing thereon multiple second-type sheet articles (not shown) to be scanned. In an embodiment, the first-type sheet articles are ordinary documents (e.g. A4-sized documents), and the second-type sheet articles are business cards. The first sheet pick-up roller assembly 13 is arranged beside the first sheet input tray 12 for feeding the first-type sheet articles on the first sheet input tray 12 into the internal portion of the sheet-feeding type scanning apparatus 1. The sheet ejecting tray 14 is arranged under the first sheet input tray 12 for supporting thereon the ordinary documents or the business cards that have been scanned by the scanning module 10. The sheet ejecting roller assembly 19 is arranged beside the sheet ejecting tray 14 for transporting the scanned ordinary documents or the scanned business cards to the sheet ejecting tray 14. The sheet transfer channel 15 is used for leading the ordinary documents or the business cards. The transfer roller assemblies 16 are arranged in the sheet transfer channel 15 for transporting the ordinary documents or the business cards through the sheet transfer channel 15. In FIG. 1, only the components associated with the functions of feeding and scanning the ordinary documents or the business cards are shown. The configurations of the power transmission module 21, the power-switching module 22 and the clutch module 23 will be illustrated with reference to FIG. 2.

Figure 2:
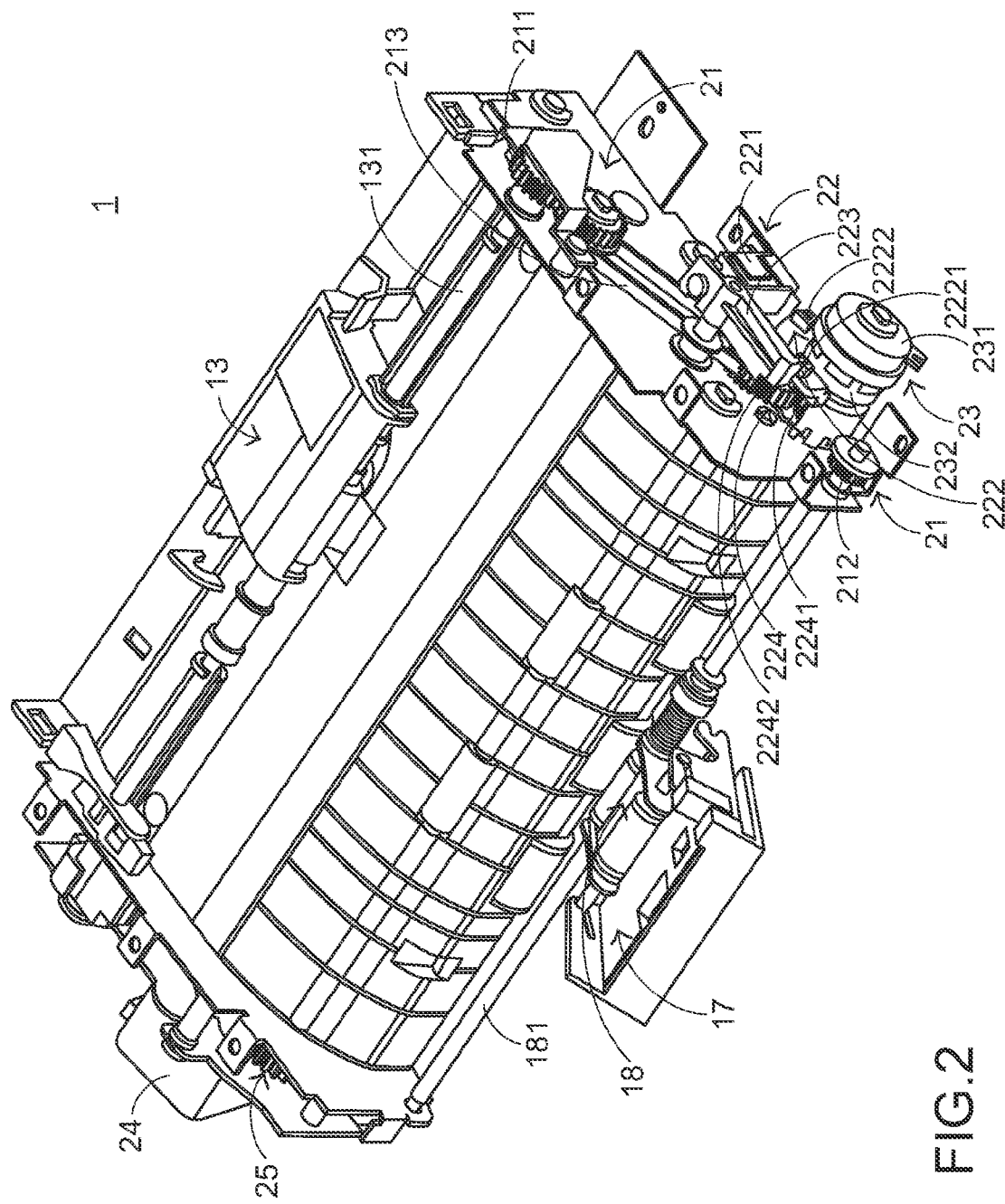
FIG. 2 is a schematic partial perspective view illustrating a portion of the sheet-feeding type scanning apparatus according to an embodiment of the present invention.

FIG. 2 is a schematic partial perspective view illustrating a portion of the sheet-feeding type scanning apparatus according to an embodiment of the present invention. The power transmission module 21 of the sheet-feeding type scanning apparatus 1 is connected to either the first sheet pick-up roller assembly 13 or the second sheet pick-up roller assembly 18. In a case that the power transmission module 21 is connected to the first sheet pick-up roller assembly 13, the power transmission module 21 transmits power to the first sheet pick-up roller assembly 13. Whereas, in a case that the power transmission module 21 is connected to the second sheet pick-up roller assembly 18, the power transmission module 21 transmits power to the second sheet pick-up roller assembly 18. The power transmission module 21 comprises a first transmission gear set 211, a second transmission gear 212 and a transmission belt 213. The power-switching module 22 is used for driving either the first sheet pick-up roller assembly 13 or the second sheet pick-up roller assembly 18. The power-switching module 22 comprises a solenoid valve 221, a switching element 222, a fastening arm 223, and a power-switching gear set 224 (see FIG. 4). The switching element 222 is arranged beside the solenoid valve 221. The switching element 222 comprises a first notch 2221 and a second notch 2222. The fastening arm 223 is connected to the solenoid valve 221. According to the operations of the solenoid valve 221, the fastening arm 223 is swung to be fixed in either the first notch 2221 or the second notch 2222. The clutch module 23 is used for controlling whether the power is transmitted to the first sheet pick-up roller assembly 13 or the second sheet pick-up roller assembly 18. The configurations of the internal portion of the clutch module 23 will be illustrated later.

Please refer to FIG. 2 again. The first sheet pick-up roller assembly 13 of the sheet-feeding type scanning apparatus 1 further comprises a first sheet pick-up roller shaft 131. The first sheet pick-up roller shaft 131 is sheathed by the first sheet pick-up roller assembly 13, and connected to the first transmission gear set 211 of the power transmission module 21. The power transmitted from the power transmission module 21 could be received by the first sheet pick-up roller shaft 131, thereby driving the first sheet pick-up roller assembly 13. The second sheet pick-up roller assembly 18 comprises a second sheet pick-up roller shaft 181. The second sheet pick-up roller shaft 181 is sheathed by the second sheet pick-up roller assembly 18, and connected to the second transmission gear set 212 of the power transmission module 21. The power transmitted from the power transmission module 21 could be received by the second sheet pick-up roller shaft 181, thereby driving the second sheet pick-up roller assembly 18. The power source of the sheet-feeding type scanning apparatus 1 is for example a motor 24. An example of the motor 24 is a stepper motor.

Figure 3:
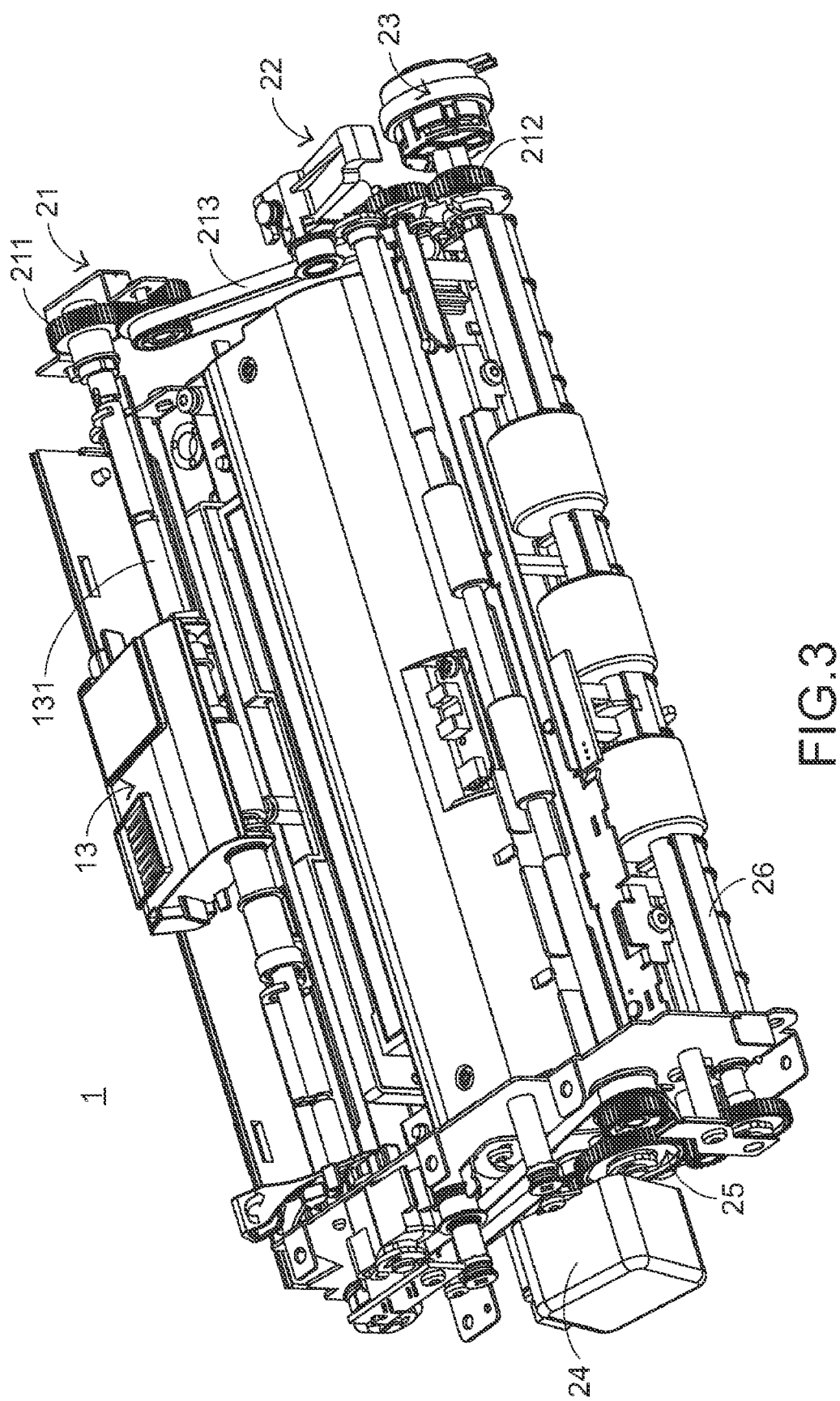
FIG. 3 is a schematic partial perspective view illustrating a portion of the sheet-feeding type scanning apparatus of FIG. 2 that is taken from another viewpoint.

FIG. 3 is a schematic partial perspective view illustrating a portion of the sheet-feeding type scanning apparatus of FIG. 2 that is taken from another viewpoint. As shown in FIG. 3, the sheet-feeding type scanning apparatus 1 comprises a motor 24 and a motor gear set 25. The motor 24 is used for providing the power. The motor gear set 25 is used for transmitting the power provided by the motor 24. The sheet-feeding type scanning apparatus 1 further comprises a transfer shaft 26. The transfer shaft 26 is connected to the motor gear set 25 and the clutch module 23. The transfer shaft 26 is driven to rotate by the motor 24, thereby transferring the power to the clutch module 23 and the power-switching module 22.

Figure 4:
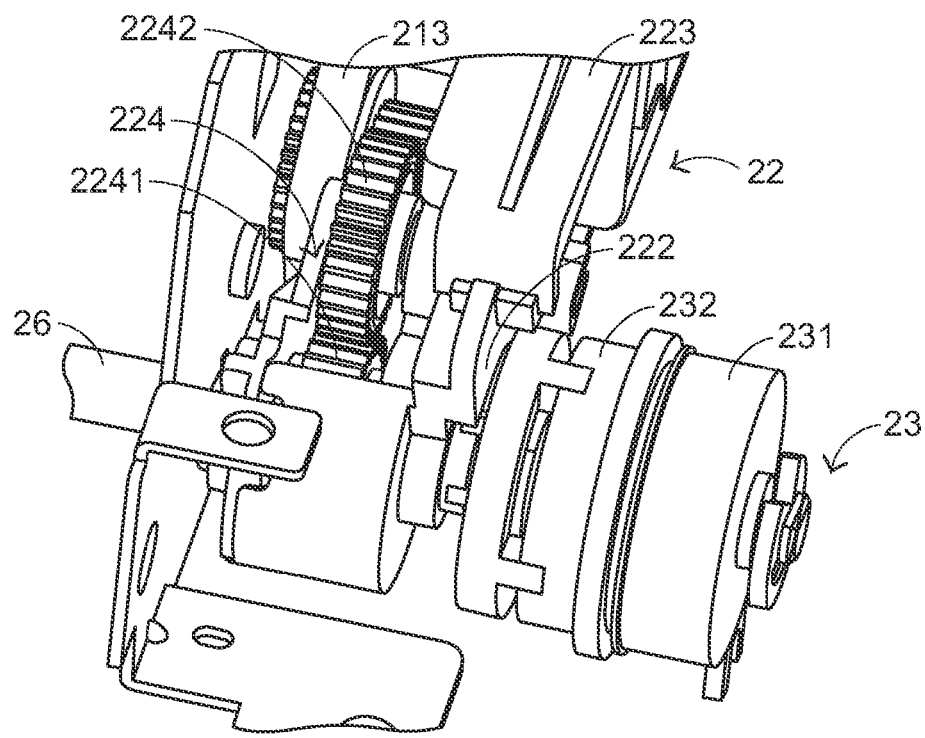
FIG. 4 is a schematic perspective view illustrating the clutch module of the sheet-feeding type scanning apparatus according to an embodiment of the present invention.
Figure 5:
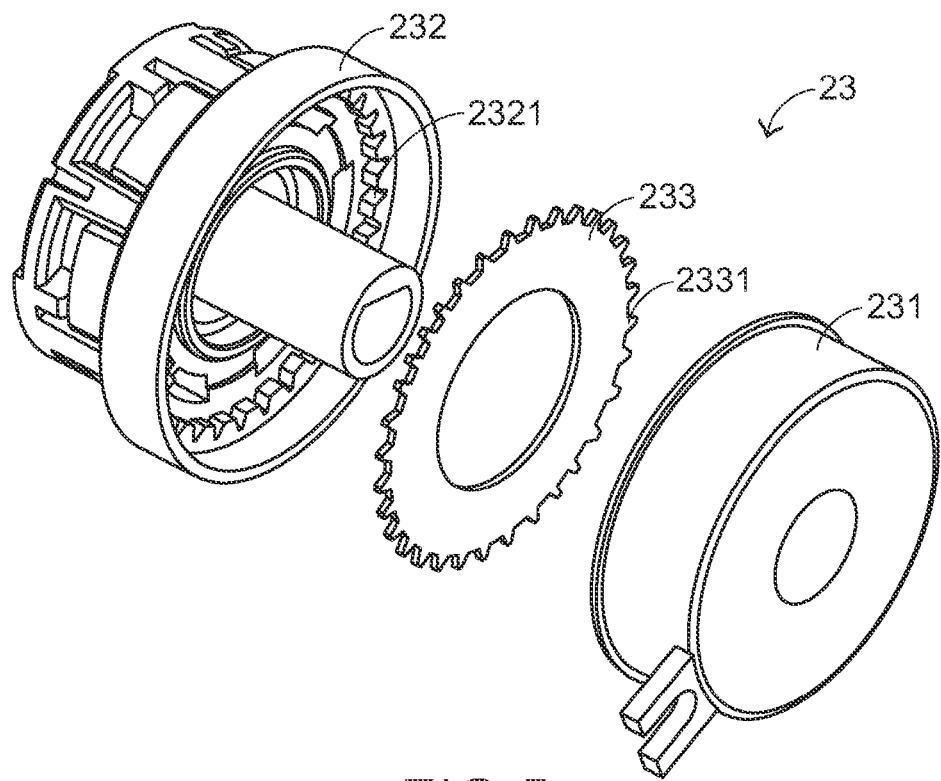
FIG. 5 is a schematic exploded view illustrating the clutch module of the sheet-feeding type scanning apparatus according to an embodiment of the present invention.

The relation between the clutch module 23 and the power-switching module 22 will be illustrated with reference to FIG. 4. FIG. 4 is a schematic perspective view illustrating the clutch module of the sheet-feeding type scanning apparatus according to an embodiment of the present invention. As shown in FIG. 4, the transfer shaft 26 is sheathed by the clutch module 23 and the power-switching module 22. Upon rotation of the transfer shaft 26, the clutch module 23 and the power-switching module 22 will be correspondingly rotated. Since the transfer shaft 26 penetrates through a D-shaped hole of the clutch module 23 (see FIG. 5) and the circular hole of the power-switching module 22, the clutch module 23 and the power-switching module 22 are not synchronously rotated. It is noted that the components with different shapes of holes are not synchronously rotated, and are not redundantly described herein. As shown in FIG. 4, the clutch module 23 comprises a magnetic coil element 231 and a connecting part 232. The power-switching gear set 224 of the power-switching module 22 is also shown in FIG. 4. The power-switching gear set 224 comprises a first power-switching gear 2241 and a second power-switching gear 2242. The first power-switching gear 2241 and the second power-switching gear 2242 are engaged with each other. The transfer shaft 26 is also sheathed by the first power-switching gear 2241, so that the first power-switching gear 2241 is rotated with the transfer shaft 26. In a case that the clutch module 23 is in a magnetized status, the first power-switching gear 2241 is driven to rotate. Since the first power-switching gear 2241 and the second power-switching gear 2242 are engaged with each other, the second power-switching gear 2242 is rotated in a direction reverse to the first power-switching gear 2241. The second power-switching gear 2242 is also disposed on the switching element 222. As the switching element 222 is rotated, the position of the second power-switching gear 2242 is changed. The internal portion of the clutch module 23 will be illustrated with reference to FIG. 5. FIG. 5 is a schematic exploded view illustrating the clutch module of the sheet-feeding type scanning apparatus according to an embodiment of the present invention. As shown in FIG. 5, the clutch module 23 comprises the magnetic coil element 231, the connecting part 232 and a metallic plate 233. The metallic plate 233 has a plurality of saw-toothed structures 2331. A saw-toothed recess 2321 is formed within the connecting part 232 for accommodating the metallic plate 233. In a case that the magnetic coil element 231 of the clutch module 23 is not magnetized, the metallic plate 233 is accommodated within the saw-toothed recess 2321, so that the connecting part 232 is rotated with respect to the magnetic coil element 231. In other words, the connecting part 232 is not synchronously rotated with the magnetic coil element 231. Whereas, in a case that the magnetic coil element 231 of the clutch module 23 is magnetized to generate a magnetic force, the metallic plate 233 is attracted by the magnetic coil element 231, so that the metallic plate 233 is synchronously rotated with the magnetic coil element 231. On the other hand, since the metallic plate 233 is shifted when attached on the magnetic coil element 231, the saw-toothed structures 2331 of the metallic plate 233 are engaged with the saw-toothed recess 2321. As such, the metallic plate 233 is driven to rotate by the magnetic coil element 231, and the connecting part 232 is driven to rotate by the metallic plate 233. In other words, the metallic plate 233 is synchronously rotated with the magnetic coil element 231.

The configurations and the relations of the components of the sheet-feeding type scanning apparatus 1 have been described above. Hereinafter, a method of solving the double feeding problem of the sheet-feeding type scanning apparatus 1 will be illustrated with reference to FIG. 6.

Figure 6:
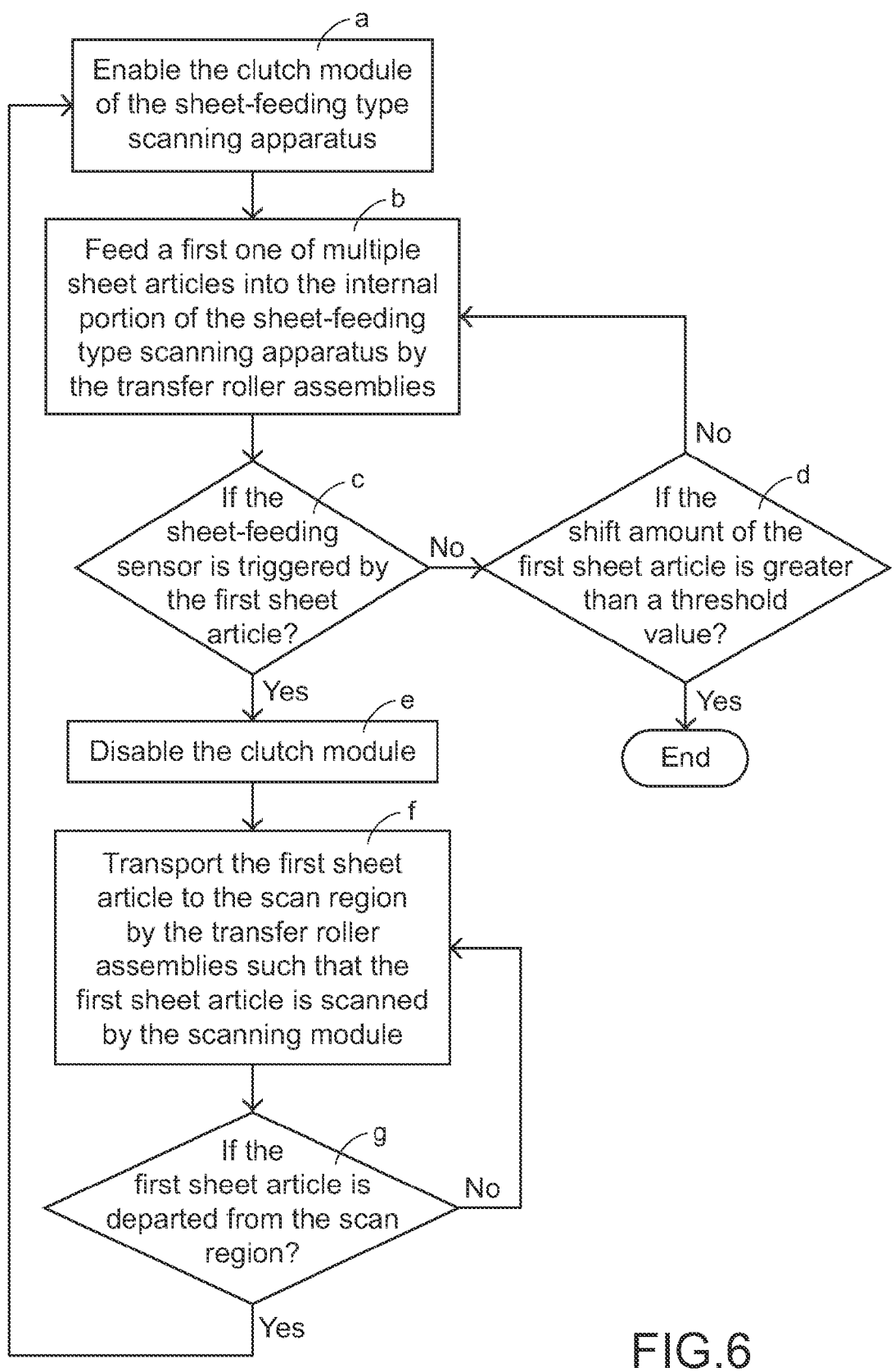
FIG. 6 is a flowchart illustrating an automatic sheet feeding method according to an embodiment of the present invention.

FIG. 6 is a flowchart illustrating an automatic sheet feeding method according to an embodiment of the present invention. First of all, the clutch module of the sheet-feeding type scanning apparatus is enabled (Step a). Next, a first one of multiple sheet articles is fed into the internal portion of the sheet-feeding type scanning apparatus by a plurality of transfer roller assemblies (Step b). Next, the automatic sheet feeding method discriminates if the sheet-feeding sensor is triggered by the first sheet article (Step c). Once the sheet-feeding sensor is not triggered by the first sheet article, the automatic sheet feeding method discriminates if the shift amount of the first sheet article is greater than a threshold value (Step d). Once the shift amount of the first sheet article is greater than the threshold value, it is meant that a jamming event occurs, and thus the operation of the sheet-feeding type scanning apparatus is interrupted. Once the shift amount of the first sheet article is not greater than the threshold value, the Step b is repeatedly done. Whereas, once the sheet-feeding sensor is triggered by the first sheet article in the Step c, the clutch module is disabled (Step e). As such, the sheet-feeding type scanning apparatus stops feeding a second one of the multiple sheet articles. Next, the first sheet article is transported to the scan region by the transfer roller assemblies such that the first sheet article is scanned by the scanning module (Step f). Next, the automatic sheet feeding method discriminates if the first sheet article is departed from the scan region (Step g). Once the first sheet article is not departed from the scan region, the Step f is repeatedly done. Whereas, once the first sheet article is departed from the scan region, the Step a is repeatedly done, and then the second sheet article is fed into the internal portion of the sheet-feeding type scanning apparatus to be scanned.

Hereinafter, the automatic sheet feeding method applied to the sheet-feeding type scanning apparatus 1 of the present invention will be illustrated in more details.

Figure 7:
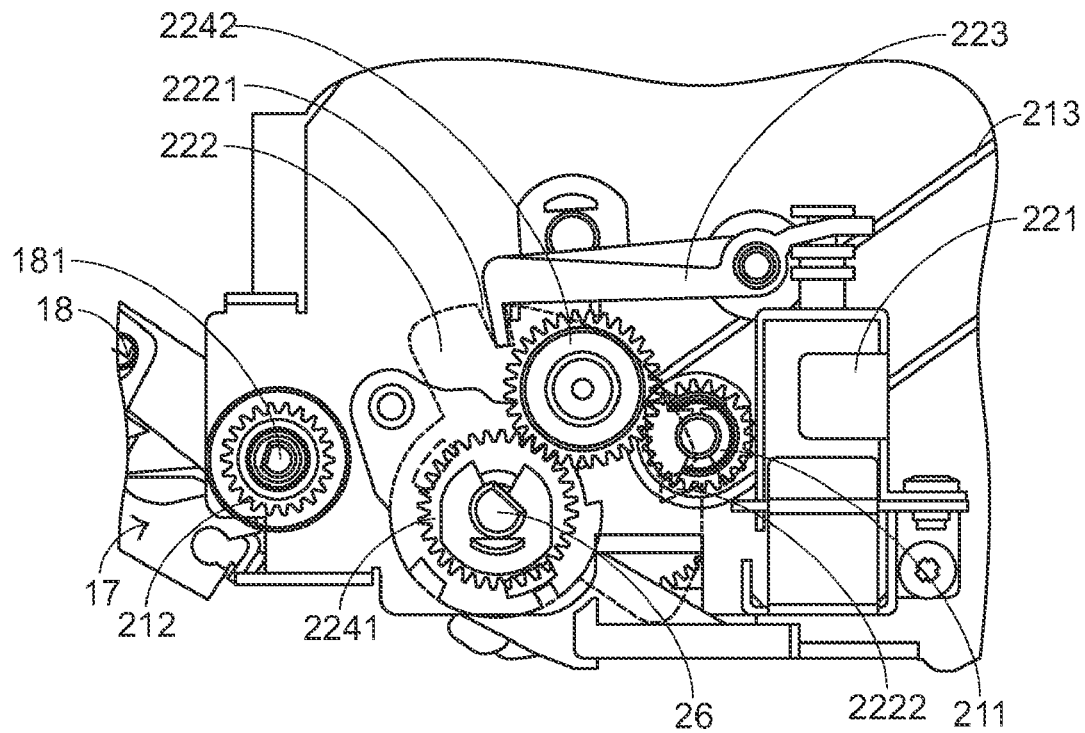
FIG. 7 is a schematic view illustrating the connection between the power-switching module and the first transmission gear set of the sheet-feeding type scanning apparatus according to an embodiment of the present invention.

Please refer to FIGS. 1 and 3. For scanning A4-sized documents, a stack of A4-sized documents are placed on the first sheet input tray 12. When the process of feeding the documents starts, the motor 24 provides power and transmits the power to the power-switching module 22 and the clutch module 23 through the motor gear set 25 and the transfer shaft 26. Next, please refer to FIGS. 2 and 4. FIG. 7 is a schematic view illustrating the connection between the power-switching module and the first transmission gear set of the sheet-feeding type scanning apparatus according to an embodiment of the present invention. When the power is transmitted to the power-switching module 22 and the clutch module 23, the power-switching module 22 and the clutch module 23 are enabled (Step a). The switching element 222 of the power-switching module 22 is rotated. According to the operations of the solenoid valve 221, the fastening arm 223 is swung to be fixed in the first notch 2221 of the switching element 222, and the switching element 222 is no longer rotated. On the other hand, as the switching element 222 is rotated in the clockwise direction, the second power-switching gear 2242 is moved to be engaged with the first transmission gear set 211, so that the power-switching module 22 transmits power to the first sheet pick-up roller assembly 13. That is the power provided by the motor 24 is transmitted to the first sheet pick-up roller assembly 13 through the motor gear set 25, the transfer shaft 26, the clutch module 23, the first power-switching gear 2241, the second power-switching gear 2242, the first transmission gear set 211, the transmission belt 213 and the first sheet pick-up roller shaft 131.

Please refer to FIG. 1 again. When a first one of a stack of documents (also referred as the first document) is fed into the sheet transfer channel 15 of the sheet-feeding type scanning apparatus, the first document is transported by the transfer roller assemblies 16 (Step b). Once the sheet-feeding sensor 20 is triggered by the first document in the Step c, the sheet-feeding sensor 20 generates an disabling signal to the clutch module 23. In response to the disabling signal, the magnetic coil element 231 of the clutch module 23 is no longer magnetized, so that the metallic plate 233 is no longer attracted by the magnetic coil element 231. Under this circumstance, the metallic plate 233 is returned back to be accommodated within the saw-toothed recess 2321 of the connecting part 232, and the connecting part 232 is no longer synchronously rotated with the magnetic coil element 231, thereby resulting in idle-running of the clutch module 23. At this moment, the first sheet pick-up roller assembly 13 fails to receive power to feed a second one of the stack of documents (also referred as the second document). Next, the first document is transported to the scan region 11 such that the first document is scanned by the scanning module 10 (Step f). After the first document is scanned, the automatic sheet feeding method discriminates if the first document is departed from the scan region 11 (Step g). Once the first document is not departed from the scan region 11, the first document is continuously scanned or transported. Whereas, once the first document is departed from the scan region 11, the Step a is repeatedly done to enable the clutch module 23. Next, the second document is fed into the sheet transfer channel 15 and scanned by the scanning module 10. In this embodiment, the motor 24 is a stepper motor. According to the step counts of the stepper motor 24, the shift amount of the document is calculated in order to discriminate whether the document is departed from the scan region 11. After the first document is departed from the scan region 11, the first document is exited to the sheet ejecting tray 14 by the transfer roller assemblies 16 and the sheet ejecting roller assembly 19. Meanwhile, the scanning operation on the first document is completed.

Moreover, once the sheet-feeding sensor 20 is not triggered by the first document in the Step c, the automatic sheet feeding method discriminates if the shift amount of the first document is greater than a threshold value (Step d). Once the shift amount of the first document is not greater than the threshold value, the Step b is repeatedly done in order to continuously transport the first document. Once the shift amount of the first document is greater than the threshold value, the operation of the sheet-feeding type scanning apparatus 1 is interrupted. The shift amount of the first document greater than the threshold value indicates that a jamming event occurs. At this moment, the jamming event should be eliminated and then the operation of the sheet-feeding type scanning apparatus 1 could be performed. Afterwards, the procedures of feeding and scanning the second document are similar to the procedures of feeding and scanning the first document, and are not redundantly described herein.

Figure 8:
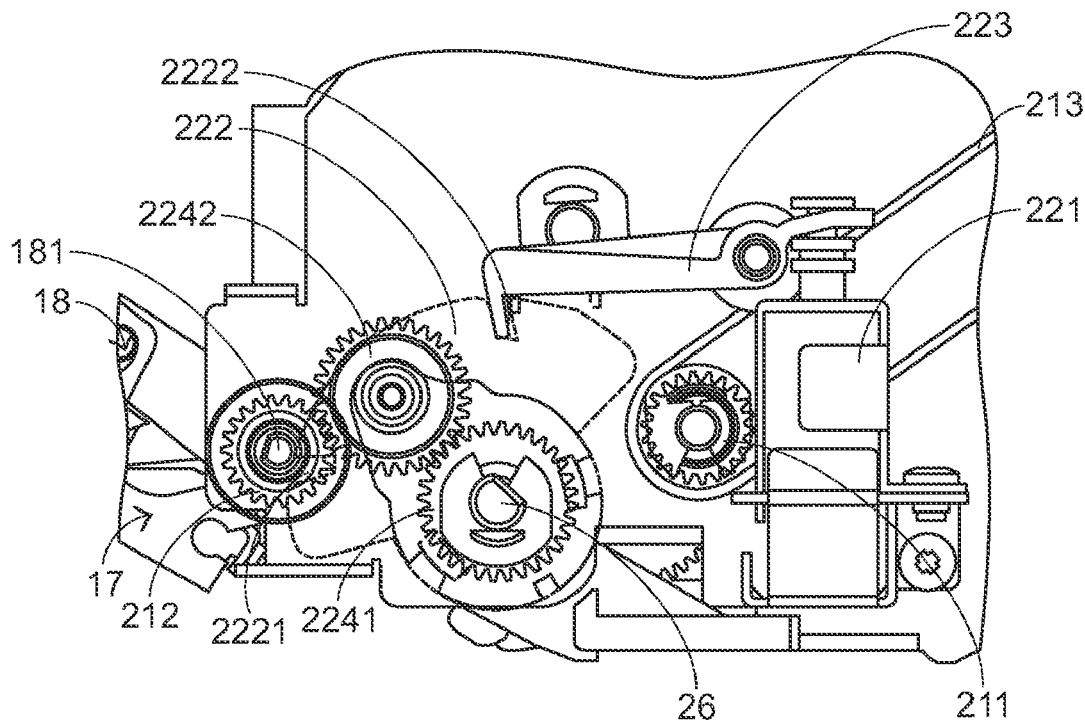
FIG. 8 is a schematic view illustrating the connection between the power-switching module and the second transmission gear set of the sheet-feeding type scanning apparatus according to an embodiment of the present invention.

FIG. 8 is a schematic view illustrating the connection between the power-switching module and the second transmission gear set of the sheet-feeding type scanning apparatus according to an embodiment of the present invention. Please refer to FIGS. 1 and 8. For scanning business cards, a stack of business cards are placed on the second sheet input tray 14.

Similarly, the power provided by the motor 24 is also transmitted to the power-switching module 22 and the clutch module 23. As such, the switching element 222 is rotated in the anti-clockwise direction, and the fastening arm 223 is in the second notch 2222. At this moment, the second power-switching gear 2242 is engaged with the second transmission gear set 212, and the power-switching module 22 transmits power to the second sheet pick-up roller assembly 18 through the second sheet pick-up roller shaft 181, thereby driving the second sheet pick-up roller assembly 18. The procedures of feeding and scanning the business cards are similar to the procedures of feeding and scanning the ordinary documents, and are not redundantly described herein From the above description, the sheet-feeding type scanning apparatus of the present invention is capable of feeding a single document into the internal portion thereof in each time by the cooperation of the sheet-feeding sensor and the clutch module. As a consequence, the double feeding problem is solved. Furthermore, the sheet-feeding type scanning apparatus of the present invention is capable of feeding ordinary documents and business cards, and thus the applications are expanded. In comparison with the conventional sheet-feeding type scanning apparatus, the sheet-feeding type scanning apparatus of the prevent invention is effective to solve the double feeding problem and has expanded applications.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet-feeding type scanning apparatus for scanning a sheet article, said sheet-feeding type scanning apparatus comprising:
  a scanning module for scanning said sheet article when said sheet article is transported across a scan region, thereby obtaining an image of said sheet article;
  a first sheet input tray arranged at a first side of said scanning module for placing said sheet article thereon;
  a first sheet pick-up roller assembly arranged beside said first sheet input tray for feeding said sheet article that is placed on said first sheet input tray into an internal portion of said sheet-feeding type scanning apparatus;
  a sheet ejecting tray for supporting said sheet article after being scanned;
  a sheet transfer channel arranged between said first sheet input tray and said scan region for leading said sheet article;
  a plurality of transfer roller assemblies for transporting said sheet article;
  a sheet ejecting roller assembly arranged beside said sheet ejecting tray for transporting said sheet article to said sheet ejecting tray;
  a sheet-feeding sensor arranged at a second side of said scanning module for detecting said sheet article, wherein once said sheet article is detected by said sheet-feeding sensor, said sheet-feeding sensor is triggered to generate a disabling signal; and
  a clutch module connected to said sheet-feeding sensor for controlling whether power is transmitted to said first sheet pick-up roller assembly, wherein in response to said disabling signal, said clutch module is disabled such that an operation said first sheet pick-up roller assembly is terminated, wherein said clutch module comprises:
  a magnetic coil element for generating a magnetic force;
  a connecting part coupled to said magnetic coil element, and comprising a saw-toothed recess, wherein said connecting part is rotated with respect to said magnetic coil element or synchronously rotated with said magnetic coil element; and
  a metallic plate accommodated within said saw-toothed recess of said connecting part, and comprising a plurality of saw-toothed structures, wherein when said magnetic coil element is magnetized to generate said magnetic force, said metallic plate is attracted by said magnetic coil element and said saw-toothed structures of said metallic plate are engaged with the saw-toothed recess, so that said metallic plate is synchronously rotated with said magnetic coil element, wherein when said magnetic coil element is not magnetized, said metallic plate is accommodated within said saw-toothed recess, so that said connecting part is rotated with respect to said magnetic coil element.

2. The sheet-feeding type scanning apparatus according to claim 1 further comprising:
  a second sheet input tray arranged at said second side of said scanning module for placing a second sheet article thereon; and
  a second sheet pick-up roller assembly arranged beside said second sheet input tray for feeding said second sheet article that is placed on said second sheet input tray into said internal portion of said sheet-feeding type scanning apparatus, wherein said second sheet article is a business card.

3. The sheet-feeding type scanning apparatus according to claim 2 further comprising a power-switching module for controlling said power to be transmitted to said first sheet pick-up roller assembly or said second sheet pick-up roller assembly.

4. The sheet-feeding type scanning apparatus according to claim 3 wherein said power-switching module comprises:
  a solenoid valve;
  a switching element arranged beside said solenoid valve, and comprising a first notch and a second notch;

a fastening arm connected to said solenoid valve and swung according to an action of said solenoid valve, so that said fastening arm is fixed in said first notch or said second notch; and a power-switching gear set comprising a first power-switching gear and a second power-switching gear, wherein said first power-switching gear is engaged with said second power-switching gear to transmit said power to said second power-switching gear, said second power-switching gear is disposed on said switching element, and said second power-switching gear transmits said power to said first sheet pick-up roller assembly or said second sheet pick-up roller assembly according to a rotating status of switching element.

5. The sheet-feeding type scanning apparatus according to claim 4 further comprising a power transmission module, which is connected to said first sheet pick-up roller assembly and said second sheet pick-up roller assembly for transmitting said power to said first sheet pick-up roller assembly or said second sheet pick-up roller assembly.

6. The sheet-feeding type scanning apparatus according to claim 5 wherein said power transmission module comprises a first transmission gear set, a second transmission gear and a transmission belt.

7. The sheet-feeding type scanning apparatus according to claim 6 wherein when said switching element is rotated to have said fastening arm fixed in said first notch, said second power-switching gear is engaged with said first transmission gear set, so that said power-switching module transmits power transmits said power to said first sheet pick-up roller assembly, wherein when said switching element is rotated to have said fastening arm fixed in said second notch, said second power-switching gear is engaged with said second transmission gear set, so that said power-switching module transmits power transmits said power to said second sheet pick-up roller assembly.

8. The sheet-feeding type scanning apparatus according to claim 6 wherein said first sheet pick-up roller assembly further comprises a first sheet pick-up roller shaft, and said first sheet pick-up roller shaft is sheathed by said first sheet pick-up roller assembly and connected to said first transmission gear set of said power transmission module for receiving said power from said power transmission module, thereby driving said first sheet pick-up roller assembly.

9. The sheet-feeding type scanning apparatus according to claim 6 wherein said second sheet pick-up roller assembly further comprises a second sheet pick-up roller shaft, and said second sheet pick-up roller shaft is sheathed by said second sheet pick-up roller assembly and connected to said second transmission gear set of said power transmission module for receiving said power from said power transmission module, thereby driving said second sheet pick-up roller assembly.

10. The sheet-feeding type scanning apparatus according to claim 1 further comprising:
a motor for providing power; and
a motor gear set for transmitting said power provided by said motor.

11. The sheet-feeding type scanning apparatus according to claim 10 further comprising a transfer shaft, which is connected to said motor gear set and said clutch module and rotated when said power provided by said motor is received.

12. The sheet-feeding type scanning apparatus according to claim 10 wherein said motor is a stepper motor.

13. The sheet-feeding type scanning apparatus according to claim 1 wherein said sheet article is an A4-sized document.

14. A sheet-feeding type scanning apparatus for scanning a sheet article, said sheet-feeding type scanning apparatus comprising:
a scanning module for scanning said sheet article when said sheet article is transported across a scan region, thereby obtaining an image of said sheet article;
a first sheet input tray arranged at a first side of said scanning module for placing said sheet article thereon;
a first sheet pick-up roller assembly arranged beside said first sheet input tray for feeding said sheet article that is placed on said first sheet input tray into an internal portion of said sheet-feeding type scanning apparatus;
a sheet ejecting tray for supporting said sheet article after being scanned;
a sheet transfer channel arranged between said first sheet input tray and said scan region for leading said sheet article;
a plurality of transfer roller assemblies for transporting said sheet article;
a sheet ejecting roller assembly arranged beside said sheet ejecting tray for transporting said sheet article to said sheet ejecting tray;
a sheet-feeding sensor arranged at a second side of said scanning module for detecting said sheet article, wherein once said sheet article is detected by said sheet-feeding sensor, said sheet-feeding sensor is triggered to generate a disabling signal;
a clutch module connected to said sheet-feeding sensor for controlling whether power is transmitted to said first sheet pick-up roller assembly, wherein in response to said disabling signal, said clutch module is disabled such that an operation said first sheet pick-up roller assembly is terminated;
a second sheet input tray arranged at said second side of said scanning module for placing a second sheet article thereon;
a second sheet pick-up roller assembly arranged beside said second sheet input tray for feeding said second sheet article that is placed on said second sheet input tray into said internal portion of said sheet-feeding type scanning apparatus, wherein said second sheet article is a business card; and
a power-switching module for controlling said power to be transmitted to said first sheet pick-up roller assembly or said second sheet pick-up roller assembly, wherein said power-switching module comprises:
a solenoid valve;
a switching element arranged beside said solenoid valve, and comprising a first notch and a second notch;
a fastening arm connected to said solenoid valve and swung according to an action of said solenoid valve, so that said fastening arm is fixed in said first notch or said second notch; and
a power-switching gear set comprising a first power-switching gear and a second power-switching gear, wherein said first power-switching gear is engaged with said second power-switching gear to transmit said power to said second power-switching gear, said second power-switching gear is disposed on said switching element, and said second power-switching gear transmits said power to said first sheet pick-up roller assembly or said second sheet pick-up roller assembly according to a rotating status of switching element.

15. The sheet-feeding type scanning apparatus according to claim 14 further comprising a power transmission module, which is connected to said first sheet pick-up roller assembly and said second sheet pick-up roller assembly for transmitting said power to said first sheet pick-up roller assembly or said second sheet pick-up roller assembly.

16. The sheet-feeding type scanning apparatus according to claim 15 wherein said power transmission module comprises a first transmission gear set, a second transmission gear and a transmission belt.

17. The sheet-feeding type scanning apparatus according to claim 16 wherein when said switching element is rotated to have said fastening arm fixed in said first notch, said second power-switching gear is engaged with said first transmission gear set, so that said power- switching module transmits power transmits said power to said first sheet pick-up roller assembly, wherein when said switching element is rotated to have said fastening arm fixed in said second notch, said second power-switching gear is engaged with said second transmission gear set, so that said power-switching module transmits power transmits said power to said second sheet pick-up roller assembly.

18. The sheet-feeding type scanning apparatus according to claim 16 wherein said first sheet pick-up roller assembly further comprises a first sheet pick-up roller shaft, and said first sheet pick-up roller shaft is sheathed by said first sheet pick-up roller assembly and connected to said first transmission gear set of said power transmission module for receiving said power from said power transmission module, thereby driving said first sheet pick-up roller assembly.

19. The sheet-feeding type scanning apparatus according to claim 16 wherein said second sheet pick-up roller assembly further comprises a second sheet pick-up roller shaft, and said second sheet pick-up roller shaft is sheathed by said second sheet pick-up roller assembly and connected to said second transmission gear set of said power transmission module for receiving said power from said power transmission module, thereby driving said second sheet pick-up roller assembly.

* * * * *